(12) United States Patent
Remele et al.

(10) Patent No.: US 7,471,001 B2
(45) Date of Patent: Dec. 30, 2008

(54) INTERNAL COMBUSTION ENGINE WITH ELECTRONIC POWER MODULE

(75) Inventors: Jörg Remele, Hagnau (DE); Markus Schwarz, Langenargen (DE); Andreas Schneider, Friedrichshafen (DE); Albrecht Debelak, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 0 days.

(21) Appl. No.: 11/901,888

(22) Filed: Sep. 19, 2007

(65) Prior Publication Data

US 2008/0067817 A1      Mar. 20, 2008

(30) Foreign Application Priority Data

Sep. 18, 2006      (DE) .................... 10 2006 044 346

(51) Int. Cl.
*F02N 11/08*          (2006.01)
(52) U.S. Cl. ....................................... 290/1 A
(58) Field of Classification Search .................. 290/1 A
See application file for complete search history.

(56) References Cited

U.S. PATENT DOCUMENTS

| | | | |
|---|---|---|---|
| 6,639,328 B2 * | 10/2003 | Wacknov | 290/52 |
| 7,002,271 B2 * | 2/2006 | Reed et al. | 310/71 |
| 7,028,819 B2 * | 4/2006 | Saito et al. | 191/2 |
| 2002/0113492 A1 * | 8/2002 | Sakamoto et al. | 307/10.1 |
| 2003/0085062 A1 * | 5/2003 | Bowen | 180/65.1 |
| 2004/0103646 A1 * | 6/2004 | Weigand et al. | 60/280 |
| 2005/0151516 A1 * | 7/2005 | Montgomery et al. | 322/45 |

FOREIGN PATENT DOCUMENTS

| | | |
|---|---|---|
| DE | 198 37 782 | 2/2000 |
| DE | 101 03 368 | 5/2003 |
| DE | 10103638 A1 * | 5/2003 |
| DE | 103 35 308 | 2/2004 |
| EP | 980975 A1 * | 2/2000 |

\* cited by examiner

*Primary Examiner*—Joseph Waks
(74) *Attorney, Agent, or Firm*—Klaus J. Bach

(57) ABSTRACT

In an internal combustion engine including an electronic engine control unit and electric consumers including an electric generator, a starter system, a performance module having integrated therein switching means for activating or deactivating consumers and monitoring means for the surveillance of the consumers and also power distribution means for the distribution of the electric power to the consumers is connected to the crankcase of the engine and wired via wiring harnesses to the engine and the consumers.

10 Claims, 2 Drawing Sheets

INTERNAL COMBUSTION ENGINE WITH ELECTRONIC POWER MODULE

BACKGROUND OF THE INVENTION

The invention relates to an internal combustion engine with an electronic engine control unit, electric consumers, an electric generator, a starter system and an electric power module.

In practice, the manufacturer of an internal combustion engine supplies to the final customer, in addition to the internal combustion engine and the electronic engine control unit, also the electric power generator and the starting system for example an electric starter motor, a flame starter unit or a compressed air starter. These components are mounted to the crankcase but not electrically wired. At the location of the final customer, the power supply arrangement is then completed. For example, following the installation of the internal combustion engine in a tracked vehicle, in a first step, the electronic engine control unit is connected to the starter relay of the electric starter. In a second step, then the starter relay is connected to the starters mounted to the internal combustion engine via a wiring harness. The same applies to the electric generator. In a third step, the starter battery is connected to a central supply voltage connector which is disposed at the crank shaft housing. Generally, the starter relays and the control unit for the generator are arranged in a separate switching cabinet. For design reasons, the wiring of a flame starter unit as a starter aid or of a compressed air starter unit is even more complicated. In connection with all three starter systems however, the high wiring needs are critical since the wiring represents a source of failures.

It is the object of the present invention to reduce the wiring requirements for such an internal combustion engine.

SUMMARY OF THE INVENTION

In an internal combustion engine comprising an electronic engine control unit and electric consumers including an electric generator and a starter system, a performance module having integrated therein switching means for activating or deactivating consumers and monitoring means for the surveillance of the consumers and a power distribution means for the distribution of the electric power to the consumers are connected to the crankcase of the engine and wired via wiring harnesses to the engine and the consumers.

The power module may be connected to the consumers via a first and a second wiring harness and a third wiring harness may be provided which connects the power module to the electronic engine control unit for the transmission of an electronic bus systems.

Since the manufacturer can now supply the internal combustion engine, the electronic control unit, the power module and the starter system fully wired, the wiring needs and expenses at the end user are reduced. At the end user only the power module and the starter battery need to be interconnected. As a result, not only the efforts and expenses required at the end user are reduced but the failure frequency is also reduced and the costs are lower than for corresponding prior art apparatus since the electric cables are shorter and have smaller cross-sections.

The integration of the surveillance means into the power module also permits a targeted diagnosis. Monitored are the electric power supply voltage, the supply lines to the consumers, the charging operation of the electric power generator, and the characteristic values of the starter system. With an electric starter system, those values are the starter engagement current, the relays holding current and optionally the engagement state of the starter engagement relay. In a compressed air starter unit, the pressure level of the compressed air is monitored. In a flame starter unit, the ignition glow current, the fuel pressure and freedom of failure of the electric supply lines to the fuel values are monitored.

The invention will become more readily apparent from the following description of a preferred embodiment thereof on the basis of the accompanying drawings.

DESCRIPTION OF THE PREFERRED EMBODIMENT

Figure 1:
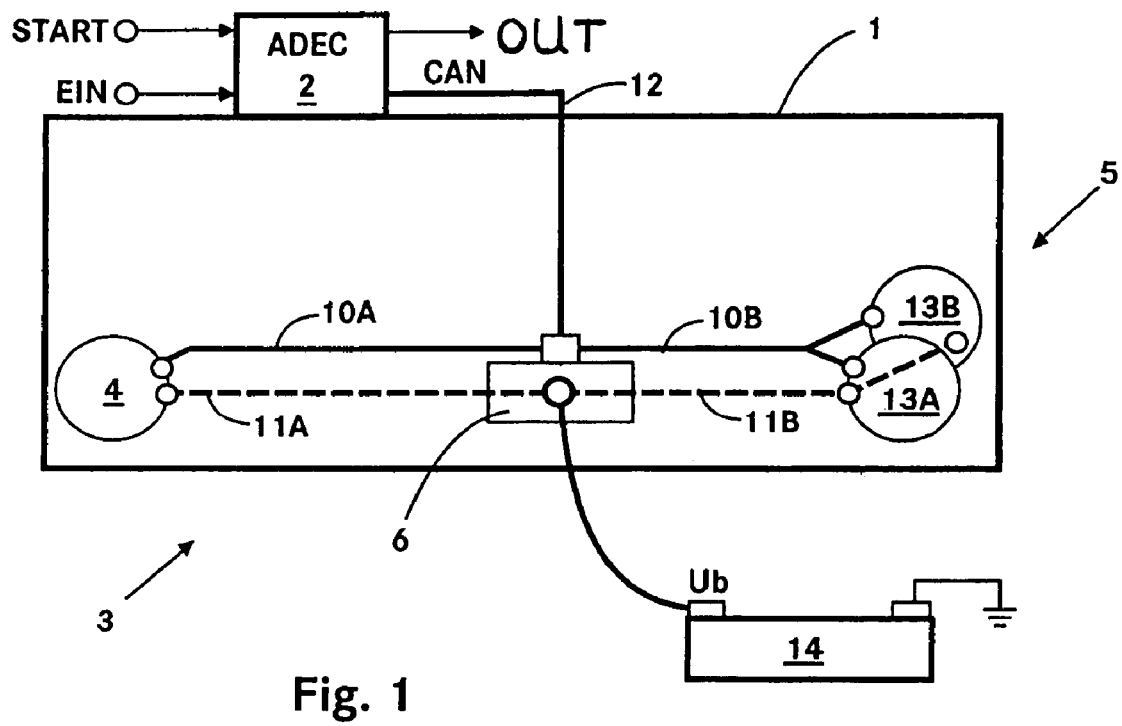
FIG. 1 shows schematically the system according to the invention.

FIG. 1 shows schematically a system including an internal combustion engine 1 with an electronic engine control unit (ADEC) 2, a power module 6 and power consumers 3. The latter includes the electric power generator 3 and a starter system 5. The operation of the internal combustion engine 1 is determined by the electronic control unit 2. It includes the normal components of a microcomputer system, such as a microprocessor, I/O components, buffer and storage components (EEPROM, RAM). The storage components contain in performance graphs and characteristic curves the operational data relevant to the operation of the internal combustion engine. By way of these records, the electronic engine control unit 2 computes the output values from the input values. As input values for example a signal START for starting the internal combustion engine 1 and a signal IN are shown. The value IN is representative for all the other input signals, for example, the engine speed, a rail pressure in a common rail fuel injection system and the temperatures of the coolant or the lubricant or of the fuel.

In FIG. 1, as output values of the engine control unit, a signal CAN and a value OUT are shown. The value OUT is representative of all the other signals used in controlling the internal combustion engine 1, for example, a control signal for controlling the inlet throttle valve of the common rail injection system and the control signals for controlling the operation of the fuel injectors. The signal CAN designates an electronic bus system by way of which the electronic engine control unit 2 and the power module 6 communicate with each other.

Figure 2:
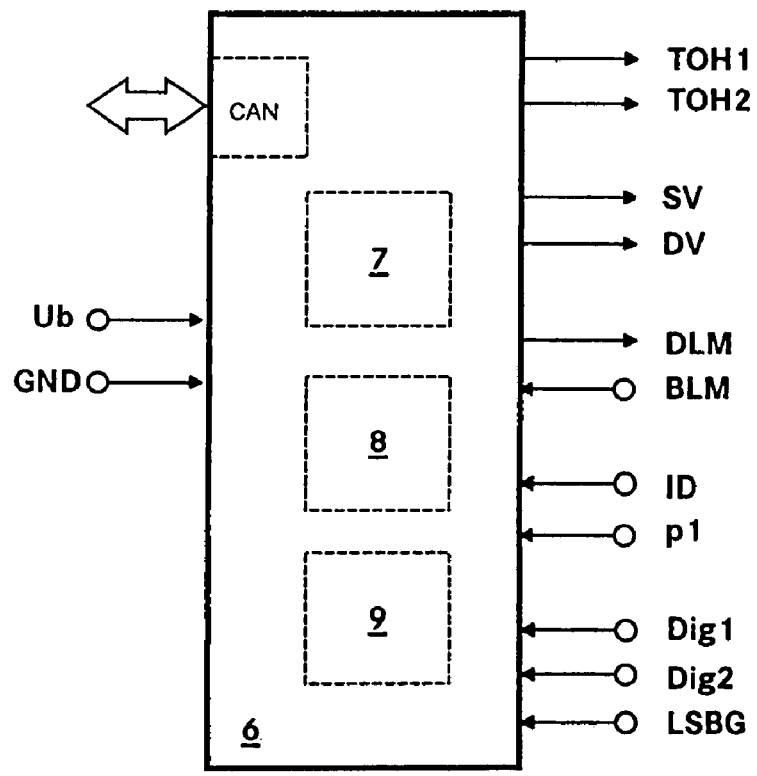
FIG. 2 is a block diagram of the power module.

A power module 6 is mounted on the crankcase of the internal combustion engine 1 and is connected via a first wiring harness (wiring harness 10A, wiring harness 10B) to the electric generator 4 and via a second wiring harness (wiring harness 11A, wiring harness 11B) to the starter system 5. In this embodiment as starter system 5 two electric starter 13 are shown. By way of the first wiring harness 10, the electric generator 4 and the starter 13 are activated or deactivated in that the power module 6 switches the potential of the supply voltage Ub to the first wiring harness 10 (activation) or it interrupts the connection (deactivation). To this end, the power module 6 includes an integral switching device 7 (FIG. 2). Via the second wiring harness 11, the supply voltage Ub and the reference potential GND are permanently supplied to the electric generator 4 and the starter in a star-like arrangement. To this end, a power distribution unit 9 is integrated into the power module 6 (FIG. 2). By way of a third wiring harness 12, the power module 6 and the electronic engine control unit 2 are in communication with one another. The power module is connected to a starter battery 14 which provides the supply voltage Ub.

The invention will be further explained on the basis of FIG. 2 which is a block diagram of the performance module 6.

The arrangement has the following functionality:

The performance module is activated upon application of the supply voltage Ub. By way of a corresponding coding in the first wiring harness 10, the performance module 6 identifies at the input ID, the starters system 5 which is connected. In the exemplary embodiment shown, the performance module recognizes two electric starters 13. With the supply voltage Ub applied and the wiring harness disconnected the performance module 6 examines the functionality of the individual channels and signalizes via a diagnosis lamp whether there is no fault or a fault has been recognized in the performance module. After the wiring harness 10 has been plugged in, the performance module 6 logs on, under the knot number and the starter configuration, to the electronic engine control unit 2 via the CAN bus system. When the electronic engine control system 2 has recognized the performance module 6, the recognized starter system comprising for example two electric starters is selected in the starting procedure. The whole starting procedure is controlled by the electronic engine control unit 2. The performance module 6 corresponds therefore to an intelligent expanded input and output junction which is controlled by the electronic control unit 2.

When the operator demands a startup procedure via the signal START, the electronic engine control unit 2 activates the two starters 13 via the switching means 7 integrated into the performance module 6. In FIG. 2, this corresponds to the two output channels TOH1 and TOH2 where then the positive potential of the supply voltage Ub, for example, 24V, is then applied. During the starting procedure, the monitoring means 8 examines the status of the two output channels TOH1 and TOH2 on the basis of the current curve and examines the supply voltage Ub. Optionally, it is also possible to examine, via the two inputs Dig1 and Dig2, the engagement state of the starter relay (clamp 48/45) and the operation of the electric generator 4. The functionality of the electric generator 4 is examined in a first step in that, via the switching means 7, the signal DLM is set to the value of the supply voltage ub, whereby the base excitation of the electric power generator is switched on. In a second step, then the voltage at the input BLM is then compared with the voltage of the signal DLM by way of the monitoring means 8.

The starting procedure is considered fault-free if a fault-free engagement of the starter 13 is recognized. A fault-free engagement of the starter is recognized when the detected current level of the starters 13 with respect to the supply voltage Ub has dropped within a given time to a holding value of, for example, 16A, that is, a sudden drop in the current from the engagement value to the holding value has been recognized and the supply voltage is within a predeterminable tolerance band.

When a fault free starting procedure is recognized, the electronic control unit initiates the further starting procedure, for example, by determining the engine speed and the rail pressure and initiating the fuel injection.

If a faulty starting procedure is determined, the starting procedure is interrupted by the electronic engine control unit 2, the two output channels TOH1 and TOH2 are deactivated and this is indicated to the operator.

In FIG. 2, an optional input channel LSBG is indicated. By way of this channel, the performance module 6 recognizes the switching state of a safety switch. For example, in a ship application, the safety switch can indicate that the internal combustion engine is being serviced. The safety switch then prevents a ship operator from accidentally initiating the starting procedure.

In FIG. 2, two additional output channels SV and DV and also an input channel p1 are shown. If as starter system a compressed air starter unit is used, the switching means 7 activates, via the output channel SV, a starter valve and, via the output channel DV, a throttle valve of the compressed air starter. The air pressure is monitored by the monitoring means 8 via the input channel p1. The functionality of the additional inputs corresponds to that described earlier in connection with a starter system with electric starters.

In connection with a flame starter arrangement as starter system, the input and output channels of the performance module 6 of FIG. 2 have the following assignments:

the output channels TOH1 and TOH2 are provided for the activation of the glow plugs;

the output channels SV and DV are for the activation of the fuel valves;

the input channel p1 monitors the fuel tank pressure.

Figure 3A:
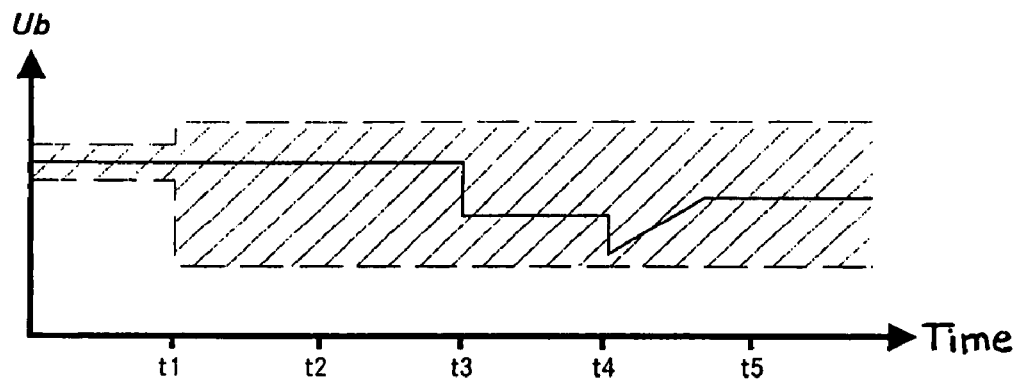
FIGS. 3a, 3b and 3c show time-based diagrams of a starting procedure.
Figure 3B:
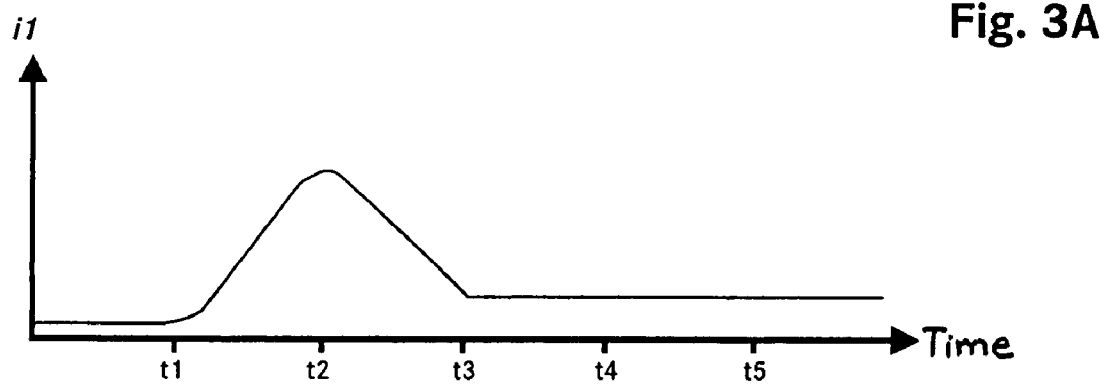
Figure 3C:

The functionality of the additional inputs are as described earlier for a starter system with electric starters 13. They show, over time, respectively, the supply voltage Ub (FIG. 3A), the current i1 at the output channel TOH1 of the performance module 6 (FIG. 3C) and the current 12 at the output channel TOH2 of the performance module 6 (FIG. 3C). In FIG. 3A, the acceptable tolerance band for the supply voltage Ub is shown by hatching.

At the point in time t1, the starting procedure is initiated and the supply voltage is applied to the two starters via the switching means. At the time t2, the first current i1 and the second current i2 reach their maximum value, that is the engagement value, of for example 60A. In the performance module, the two current values and the respective value of the supply voltage are stored. Within the time period t2/t3, the first current i1 drops and thereby indicates that the starter is engaged. This results in a voltage drop of the supply voltage Ub at the time t3, see FIG. 3A. The voltage drop is caused by the current flowing through the first starter. Corresponding to this voltage drop of the supply voltage Ub is the voltage of the second current i2 at the time t3. In the period t3/t4, the second current i2 becomes smaller and consequently also indicates that the respective starter relay is engaged. Also, a voltage drop is caused thereby at the point in time t4. At this point, consequently, both starters are engaged. The value of the first and the second current i1 and i2 corresponds to the holding current, for example, 16A. At the time t5, a monitoring period for engagement state ends that is, at this point the starter must be engaged.

From the above description, the following advantages of the arrangement according to the invention over the state of the art are apparent:

less work is required by the final user since the internal combustion engine is delivered fully wired with the electronic engine control unit, the performance module, the starter system and the electric generator installed and wired, the material costs are reduced since the wiring harnesses are shorter and have smaller cross-section;

the chances of errors or fault occurring at the end user are reduced;

the integration of a monitoring device in the performance module permits a targeted diagnosis;

the arrangement according to the invention can be installed as retrofit equipment.

What is claimed is:

1. An internal combustion engine (1) with a crankcase and including an electronic engine control unit (2) for controlling the internal combustion engine (1), electric consumers (3) including an electric generator for generating electric energy, a starter system (5) for starting the internal combustion engine (1) and an electronic performance module (6) attached to the crankcase of the internal combustion engine (1) and including integrated therein switching means (7) for activating or deactivating the electric consumers (3), monitoring means (8) for the surveillance of the consumers (3) and power distribution means (9) for the permanent distribution of electric energy to the consumers (3).

2. An internal combustion engine (1) according to claim 1, wherein the performance module (6) and the electric consumers (3) are interconnected by first and second wiring harnesses (10, 11) and a third wiring harness (12) is provided for the transfer of an electronic bus system interconnecting the power module (6) and the electronic engine control unit (2).

3. An internal combustion engine (1) according to claim 1, wherein the starter system (5) is one of an electric starter system (13), a flame starter system and a pressurized air starter system.

4. An internal combustion engine according to claim 3, wherein the performance module (6) includes identification means (1D) for recognizing the starter system.

5. An internal combustion engine according to claim 3, wherein in connection with an electric starter (13) the monitored characteristic values are the starter engagement current, the holding current and the engagement state of the starter engagement relays, in connection with a flame starter arrangement the characteristic values are the flame glow current, the fuel pressure and the freedom of faults in the electric lines to the fuel valves, and in connection with a compressed air starter arrangement the monitored characteristic value is the pressure level of the compressed air.

6. An internal combustion engine according to claim 5, wherein the performance module (6) monitors the charge control for the electric generator (4) via the monitoring means (8).

7. An internal combustion engine according to claim 1, wherein the performance module (6) is designed to switch, via the switching device (7) the supply voltage (Ub) to the consumers (3) for the activation of the consumers (3) or to interrupt the supply voltage (ub) to the consumers for the deactivation Of the consumers (3).

8. An internal combustion engine according to claim 1, wherein the performance module (6) monitors the characteristic values of the starter system (5) via the monitoring means (8).

9. An internal combustion engine according to claim 1, wherein the performance module (6) upon activation, monitors the input and output channels and activates a diagnosis light when a fault is detected.

10. An internal combustion engine according to claim 1, wherein the performance module (6) includes an identification (LSBG) for recognizing the switching state of a safety switch for preventing an unintended starting procedure.

* * * * *